US012770442B2

(12) United States Patent
Clifton et al.

(10) Patent No.: US 12,770,442 B2
(45) Date of Patent: Oct. 20, 2026

(54) VIN BASED DIAGNOSTIC AND FLEET MANAGEMENT ANALYSIS

(71) Applicant: Oshkosh Corporation, Oshkosh, WI (US)

(72) Inventors: Cody Clifton, Oshkosh, WI (US); Zhenyi Wei, Oshkosh, WI (US); Xiang Gong, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 49 days.

(21) Appl. No.: 19/054,150

(22) Filed: Feb. 14, 2025

(65) Prior Publication Data

US 2025/0191414 A1 Jun. 12, 2025

Related U.S. Application Data

(63) Continuation of application No. 17/982,095, filed on Nov. 7, 2022, now abandoned.

(60) Provisional application No. 63/276,900, filed on Nov. 8, 2021.

(51) Int. Cl.

| | |
|---|---|
| ***B65F 3/04*** | (2006.01) |
| ***B60R 16/023*** | (2006.01) |
| ***B65F 3/02*** | (2006.01) |
| ***G06F 8/65*** | (2018.01) |
| ***G07C 5/00*** | (2006.01) |

(52) U.S. Cl.

CPC ................ *G07C 5/008* (2013.01); *B65F 3/04* (2013.01); *G06F 8/65* (2013.01); *B60R 16/0231* (2013.01); *B65F 2003/022* (2013.01); *B65F 2003/0269* (2013.01); *B65F 2003/0279* (2013.01)

(58) Field of Classification Search

CPC ......... G07C 5/008; G07C 5/0841; B65F 3/04; B65F 2003/022; B65F 2003/0269; B65F 2003/0279; B65F 3/02; G06F 8/65; B60R 16/0231

See application file for complete search history.

(56) References Cited

U.S. PATENT DOCUMENTS

| | | | |
|---|---|---|---|
| 11,766,941 | B2 | 9/2023 | Davis et al. |
| 12,049,136 | B2 | 7/2024 | Yakes et al. |
| 2011/0302214 | A1 | 12/2011 | Frye et al. |

(Continued)

FOREIGN PATENT DOCUMENTS

| | | |
|---|---|---|
| WO | WO-2023/158743 A1 | 8/2023 |

*Primary Examiner* — Ashley L Redhead, Jr.
(74) *Attorney, Agent, or Firm* — Foley & Lardner LLP

(57) ABSTRACT

A refuse vehicle having a chassis and a body assembly for storing refuse. The refuse vehicle includes a control system having a body system coupled to the body assembly, a chassis system coupled to the chassis, and a telematics system. The telematics system is configured to communicate, to the body system, a first request for a first vehicle identifier, receive, from the body system, the first vehicle identifier, and determine, based on the first vehicle identifier, a vehicle configuration. The telematics system is also configured to communicate, based on the vehicle configuration, a second request for additional vehicle information, receive, from at least one of the body system and the chassis system, the additional vehicle information, and perform, based on the additional vehicle information, a vehicle analysis, wherein the vehicle analysis includes a first characteristic of a first component of the vehicle.

20 Claims, 8 Drawing Sheets

(56) References Cited

U.S. PATENT DOCUMENTS

| | | | |
|---|---|---|---|
| 2017/0361491 | A1 | 12/2017 | Datema et al. |
| 2018/0250847 | A1 | 9/2018 | Wurtz et al. |
| 2019/0121353 | A1 | 4/2019 | Datema et al. |
| 2019/0325220 | A1 | 10/2019 | Wildgrube et al. |
| 2019/0344475 | A1 | 11/2019 | Datema et al. |
| 2020/0078986 | A1 | 3/2020 | Clifton et al. |
| 2020/0230841 | A1 | 7/2020 | Datema et al. |
| 2020/0230842 | A1 | 7/2020 | Datema et al. |
| 2020/0262366 | A1 | 8/2020 | Wildgrube et al. |
| 2020/0265656 | A1 | 8/2020 | Koga et al. |
| 2020/0346547 | A1 | 11/2020 | Rocholl et al. |
| 2020/0346556 | A1 | 11/2020 | Rocholl et al. |
| 2020/0346557 | A1 | 11/2020 | Rocholl et al. |
| 2020/0346657 | A1 | 11/2020 | Clifton et al. |
| 2020/0346854 | A1 | 11/2020 | Rocholl et al. |
| 2020/0346855 | A1 | 11/2020 | Rocholl et al. |
| 2020/0346856 | A1 | 11/2020 | Rocholl et al. |
| 2020/0346857 | A1 | 11/2020 | Rocholl et al. |
| 2020/0346861 | A1 | 11/2020 | Rocholl et al. |
| 2020/0346862 | A1 | 11/2020 | Rocholl et al. |
| 2020/0347659 | A1 | 11/2020 | Rocholl et al. |
| 2020/0347661 | A1 | 11/2020 | Rocholl et al. |
| 2020/0347857 | A1 | 11/2020 | Clifton et al. |
| 2020/0348681 | A1 | 11/2020 | Clifton et al. |
| 2020/0348764 | A1 | 11/2020 | Clifton et al. |
| 2020/0398670 | A1 | 12/2020 | Rocholl et al. |
| 2020/0398695 | A1 | 12/2020 | Rocholl et al. |
| 2020/0398697 | A1 | 12/2020 | Rocholl et al. |
| 2020/0398772 | A1 | 12/2020 | Wildgrube et al. |
| 2020/0398857 | A1 | 12/2020 | Clifton et al. |
| 2020/0399057 | A1 | 12/2020 | Rocholl et al. |
| 2020/0401807 | A1 | 12/2020 | Wildgrube et al. |
| 2020/0402325 | A1 | 12/2020 | Koga et al. |
| 2021/0124347 | A1 | 4/2021 | Datema et al. |
| 2021/0162630 | A1 | 6/2021 | Clifton et al. |
| 2021/0225095 | A1 | 7/2021 | Koga et al. |
| 2021/0229908 | A1 | 7/2021 | Rocholl et al. |
| 2021/0252995 | A1 | 8/2021 | Rocholl et al. |
| 2021/0271884 | A1 | 9/2021 | Wildgrube et al. |
| 2021/0316740 | A1 | 10/2021 | Clifton et al. |
| 2021/0316741 | A1 | 10/2021 | Clifton et al. |
| 2021/0323436 | A1 | 10/2021 | Rocholl et al. |
| 2021/0323437 | A1 | 10/2021 | Rocholl et al. |
| 2021/0323438 | A1 | 10/2021 | Rocholl et al. |
| 2021/0331635 | A1 | 10/2021 | Wildgrube et al. |
| 2021/0331636 | A1 | 10/2021 | Wildgrube et al. |
| 2021/0331637 | A1 | 10/2021 | Wildgrube et al. |
| 2021/0339632 | A1 | 11/2021 | Rocholl et al. |
| 2021/0339648 | A1 | 11/2021 | Koga et al. |
| 2021/0345062 | A1 | 11/2021 | Koga et al. |
| 2021/0394394 | A1 | 12/2021 | Datema et al. |
| 2021/0396251 | A1 | 12/2021 | Clifton et al. |
| 2021/0407222 | A1 | 12/2021 | Koga et al. |
| 2022/0105827 | A1 | 4/2022 | Rocholl et al. |
| 2022/0111559 | A1 | 4/2022 | Wurtz et al. |
| 2022/0169444 | A1 | 6/2022 | Rocholl et al. |
| 2022/0258967 | A1 | 8/2022 | Kappers et al. |
| 2022/0267090 | A1 | 8/2022 | Rocholl et al. |
| 2022/0307312 | A1 | 9/2022 | Rocholl et al. |
| 2022/0332014 | A1 | 10/2022 | Datema et al. |
| 2022/0340359 | A1 | 10/2022 | Rocholl et al. |
| 2022/0382388 | A1 | 12/2022 | Clifton et al. |
| 2023/0360450 | A1 | 11/2023 | Thomas |
| 2023/0382228 | A1 | 11/2023 | Davis et al. |
| 2024/0292192 | A1 | 8/2024 | Kobel et al. |
| 2024/0343106 | A1 | 10/2024 | Yakes et al. |
| 2025/0137792 | A1* | 5/2025 | Schad .................. G01C 21/343 |

* cited by examiner

VIN BASED DIAGNOSTIC AND FLEET MANAGEMENT ANALYSIS

CROSS-REFERENCE TO RELATED PATENT APPLICATIONS

This application is a continuation of U.S. application Ser. No. 17/982,095, filed Nov. 7, 2022, which claims the benefit of and priority to U.S. Provisional Patent Application No. 63/276,900, filed on Nov. 8, 2021, the entire disclosures of which are hereby incorporated by reference herein.

BACKGROUND

Refuse vehicles collect a wide variety of waste, trash, and other material from residences and businesses. Operators of refuse vehicles transport the material from various waste receptacles within a municipality to a storage or processing facility (e.g., a landfill, an incineration facility, a recycling facility, etc.).

SUMMARY

One exemplary embodiment relates to a refuse vehicle. The refuse vehicle includes a chassis having a frame and a first sensor, the chassis coupled with a plurality of wheels. The refuse vehicle includes a body assembly for storing refuse, the body assembly having a second sensor and supported by the chassis. The refuse vehicle includes a control system having one or more processors and one or more memory devices. The control system comprises a body system, a chassis system, and a telematics system, where the body system is communicably coupled with the body assembly, the chassis system is communicably coupled with the chassis, and the telematics system is communicably coupled with the body system and the chassis system. The telematics system is configured to communicate, to the body system, a first request for a first vehicle identifier, and receive, from the body system, the first vehicle identifier. The telematics system is also configured to determine, based on the first vehicle identifier, a vehicle configuration, and communicate, based on the vehicle configuration and to at least one of the body system and the chassis system, a second request for additional vehicle information. The telematics system is also configured to receive, from at least one of the body system and the chassis system, the additional vehicle information, and perform, based on the additional vehicle information, a vehicle analysis, wherein the vehicle analysis includes a first characteristic of a first component of the vehicle.

Another exemplary embodiment relates to a method. The method includes communicating, via a telematics system and to a body system, a first request for a first vehicle identifier, and receiving, by the telematics system and from the body system, the first vehicle identifier. The method also includes determining, by the telematics system and based on the first vehicle identifier, a vehicle configuration, and communicating, via the telematics system and based on the vehicle configuration, a second request for additional vehicle information to at least one of the body system and a chassis system. The method also includes receiving, by the telematics system and from at least one of the body system and the chassis system, the additional vehicle information, and performing, by the telematics system and based on the additional vehicle information, a vehicle analysis, wherein the vehicle analysis includes a first characteristic of a first component of a vehicle.

Another exemplary embodiment relates to a vehicle system. The vehicle system includes a network, and a control system having one or more processors and one or more memory devices. The control system includes a body system, a chassis system, and a telematics system, where the body system is communicably coupled with a body assembly, the chassis system is communicably coupled with a chassis, and the telematics system is communicably coupled with the body system and the chassis system. The telematics system is configured to communicate, to the body system, a first request for a first vehicle identifier, and receive, from the body system, the first vehicle identifier. The telematics system is configured to determine, based on the first vehicle identifier, a vehicle configuration, and communicate, based on the vehicle configuration and to at least one of the body system and the chassis system, a second request for additional vehicle information. The telematics system is configured to receive, from at least one of the body system and the chassis system, the additional vehicle information, and perform, based on the additional vehicle information, a vehicle analysis, wherein the vehicle analysis includes a first characteristic of a first component of the vehicle. The telematics system is also configured to communicate the first characteristic of the first component of the vehicle to the network, and communicate a control decision to the body system, wherein the control decision is based on the first characteristic of the first component of the vehicle.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
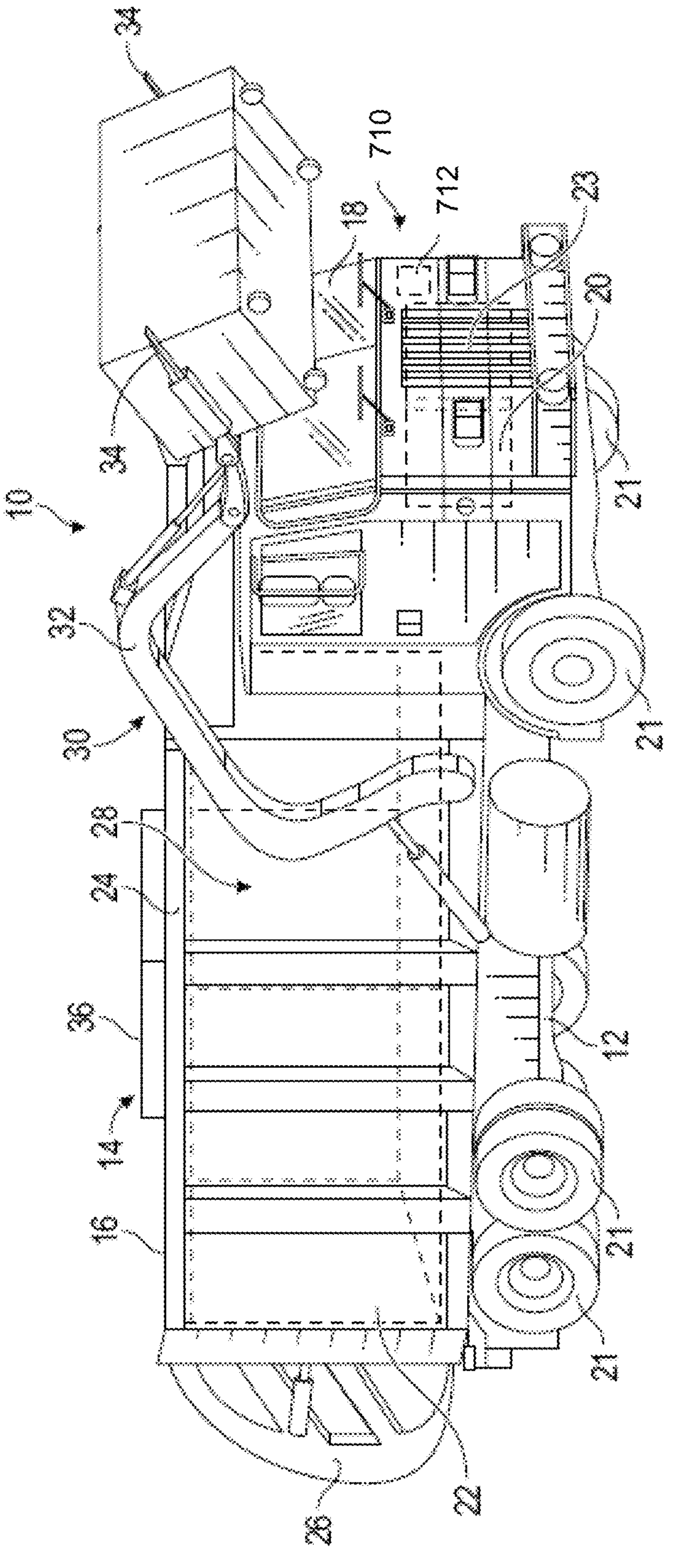
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to refuse vehicles having a control system with a telematics system, which is configured to send, receive, and analyze information relating to the vehicle. The control system, and more specifically the telematics system, may be configured to receive vehicle identification information, determine a vehicle configuration, receive additional information relating to the vehicle based on the determined vehicle configuration, and analyze the vehicle information in order to provide diagnostic and/or fleet management information.

Further, referring to the figures generally, a vehicle or machine is shown according to an exemplary embodiment. While various vehicles are described herein, it should be understood that the present disclosure similarly applies to other types of vehicles. For example, the vehicle may be a front-loading refuse truck (e.g., a garbage truck, a waste collection truck, a sanitation truck, a recycling truck, etc.), a side loading refuse truck, or a rear-loading refuse truck. The vehicle may be a rear-discharge concrete mixer truck or a front-discharge concrete mixer truck. The vehicle may also be a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle.

Refuse Truck

Referring to FIGS. 1-4, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., one or more batteries 23, ultra-capacitors, etc.), from an on-board generator (e.g., an internal combustion engine and alternator), or from an external power source (e.g., overhead power lines) and provide power to the systems of the refuse truck 10. In some examples, the on-board energy storage device is a plurality of rechargeable lithium-ion battery cells. In other embodiments, the prime mover 20 is another suitable actuator configured to utilize one or more of a variety of fuels (e.g., gasoline, diesel, bio-diesel, ethanol, natural gas, etc.) in order to provide power to the systems of the refuse truck 10.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10). The refuse truck 10 can be arranged as a front-loading refuse vehicle (shown in FIGS. 1 and 3), a side-loading refuse vehicle (shown in FIG. 2), or a rear-loading refuse vehicle (shown in FIG. 4), for example.

Figure 3:
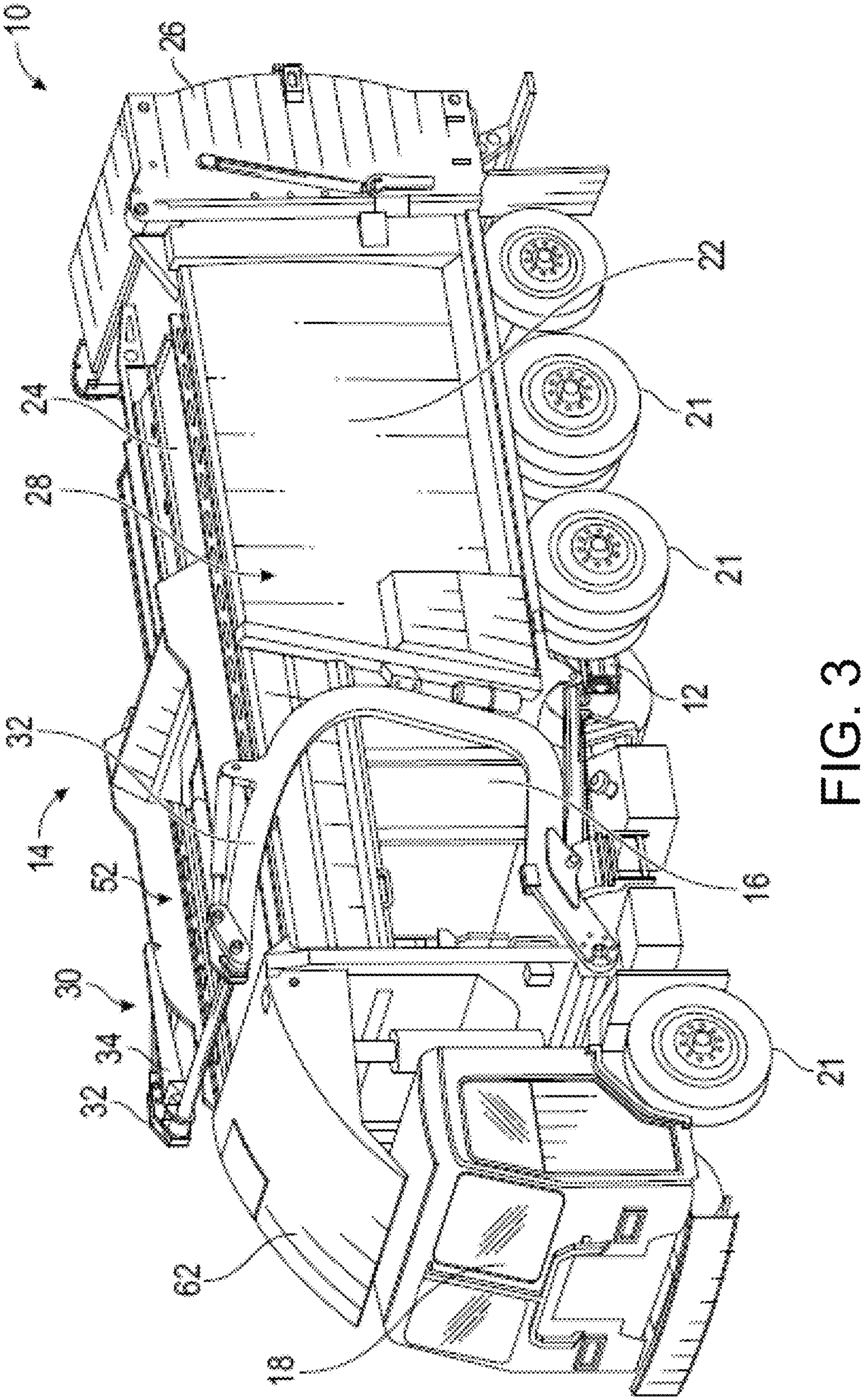
FIG. 3 is a front perspective view of a front loading refuse vehicle according to an exemplary embodiment.

Referring again to the exemplary embodiment shown in FIGS. 1 and 3, the refuse truck 10 is a front-loading refuse vehicle. As shown in FIG. 1, the refuse truck 10 includes a lifting system 30 that includes a pair of arms 32 coupled to the body 14 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. Additional actuators (e.g., a hydraulic cylinder) can articulate the forks 34 to tip the refuse out of the container and into the hopper volume of the collection chamber 28 through an opening in the cover 24. The actuators thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
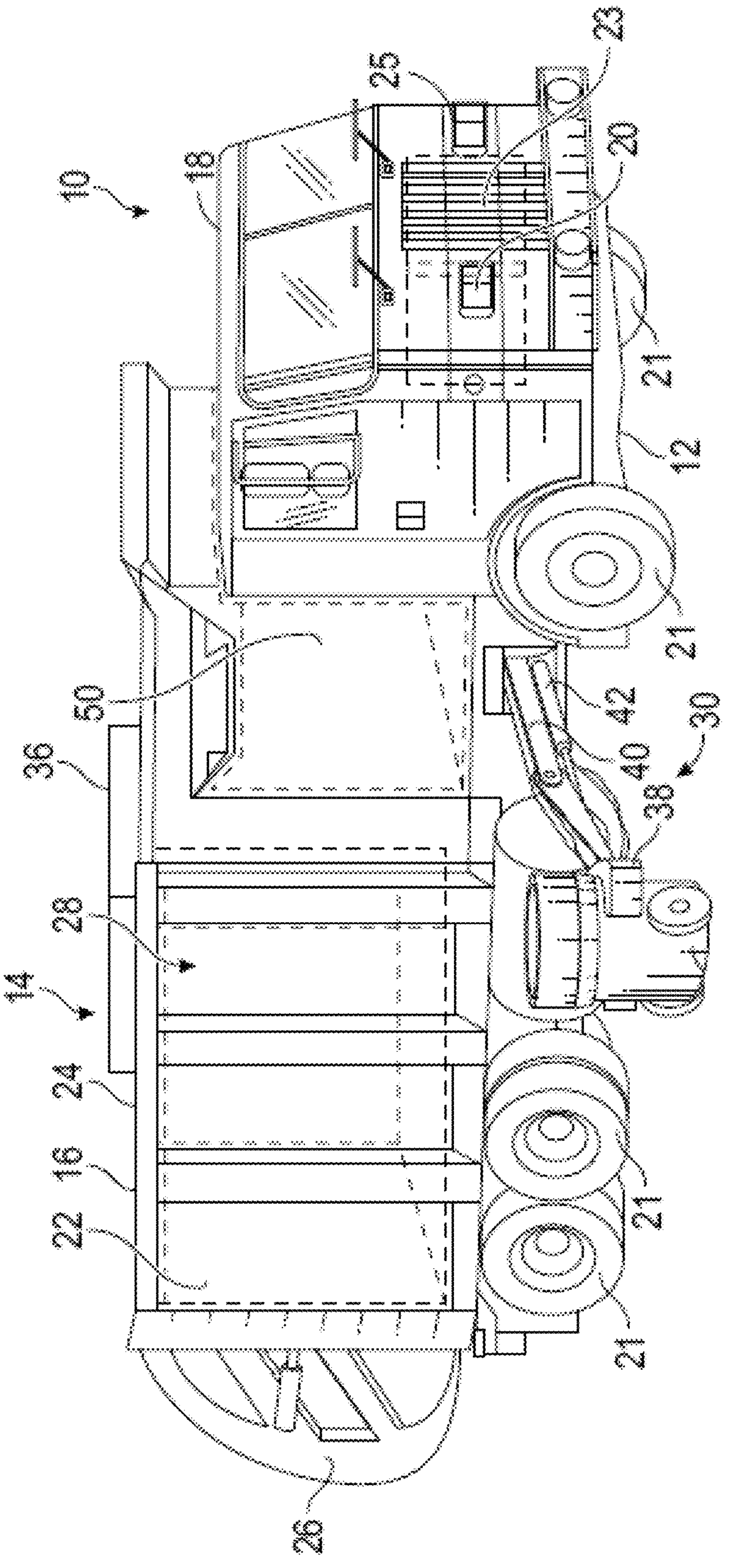
FIG. 2 is a perspective view of a side loading refuse vehicle according to an exemplary embodiment.

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse truck 10 is a front loading refuse vehicle. Like the refuse truck 10 shown in FIG. 1, the refuse vehicle includes a lifting system 30 that includes a pair of arms 32 coupled to the body 14 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). Additional actuators (e.g., hydraulic cylinders, linear actuators, etc.) articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 4:
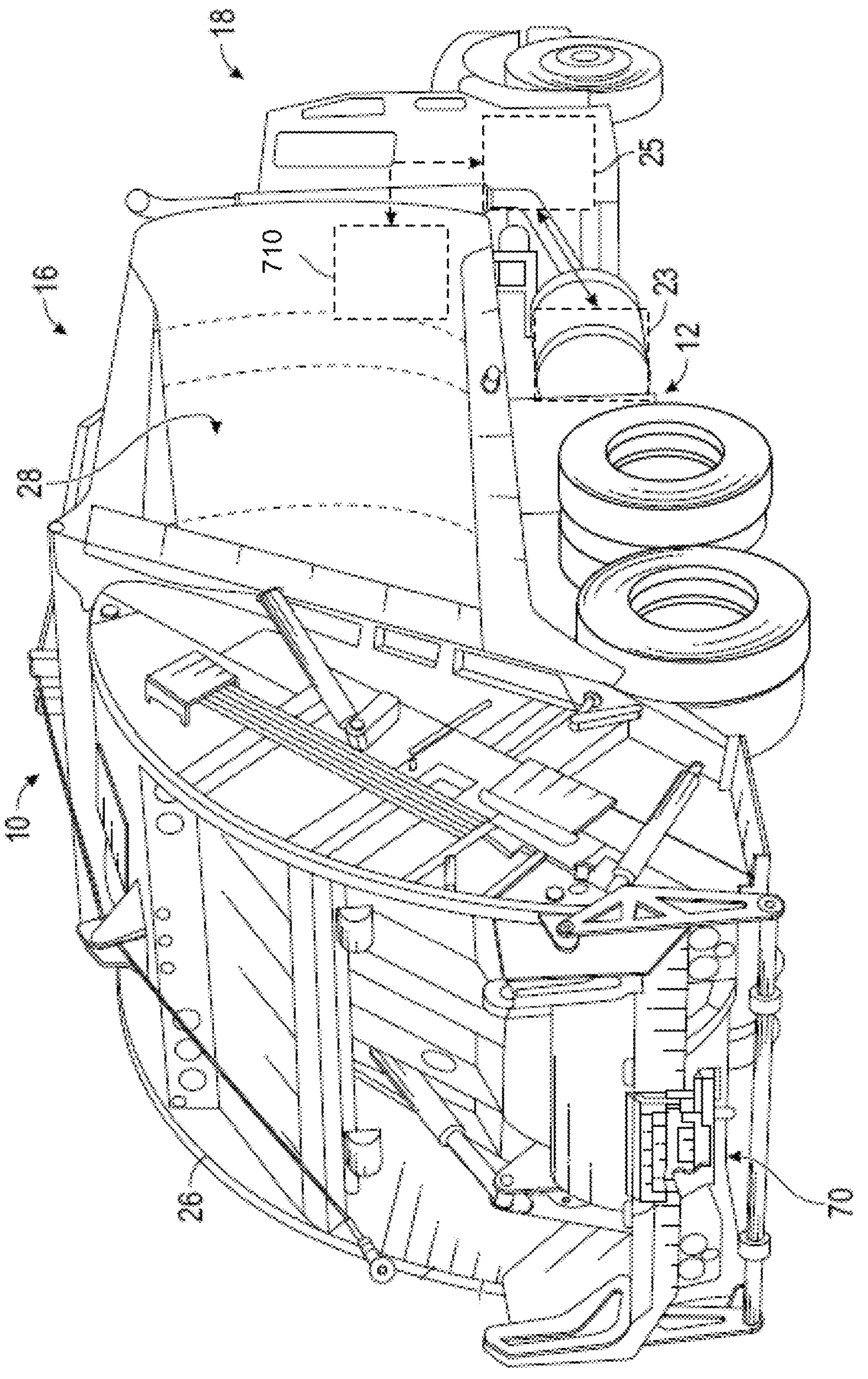
FIG. 4 is a rear perspective view of a rear loading refuse vehicle according to an exemplary embodiment.

As shown in FIGS. 2 and 4, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the prime mover 20) rotates a transmission shaft, which in turn rotates the wheels 21 of the vehicle. The batteries 23 can supply electrical power to additional subsystems on the refuse truck 10, including additional electric motors, cab controls (e.g., climate controls, steering, lights, etc.), the lifting system 30, the compactor 50, and/or auxiliary systems 60, for example.

Referring to FIG. 4, the refuse truck 10 can be a rear-loading refuse vehicle. Like the refuse truck 10 shown in FIGS. 1-3, the refuse truck 10 includes a frame 12 that supports a body assembly that includes an on-board receptacle 16 and a cab 18. A tailgate 26 is movably positioned at a rear of the on-board receptacle 16 and defines a pathway into the collection chamber 28. In some examples, a refuse can tipper assembly 70 is positioned along the tailgate 26 to help invert refuse cans relative to the ground below so that refuse can be transferred from refuse cans into the tailgate 26. A packer 62 can pull refuse within the tailgate 26 upwardly and inwardly (e.g., forwardly) toward the collection chamber 28 for compaction.

In some embodiments, the refuse truck 10 is a hybrid refuse vehicle or an all-electric refuse vehicle, for example, with an electric frame or chassis 12. In hybrid refuse vehicles, the refuse truck can include both electric and hydraulic power systems. The frame 12 supports a primary battery 23 that is configured to supply electrical power to each of the prime mover 20, shown as an electric motor, and the various systems on the body assembly 14 of the refuse truck 10. A power distribution unit (PDU) 25 is in communication with the battery 23 and is configured to selectively monitor and supply electrical power from the battery 23 to each of the body assembly 14 and the prime mover 20. The PDU 25 can be a controller, processor, central processing unit (CPU), or other type of programmable or non-programmable device that monitors the battery 23 and the systems on the body assembly 14 and frame 12 that request electrical power from the battery 23. The PDU 25 is configured to control the supply of electrical power from the battery 23 to accommodate the power requests of the various systems on the frame 12 and body assembly 14 of the refuse truck 10. The PDU 25 monitors the battery 23 and controls contactors within the battery 23 to direct electrical power to the various systems within the refuse truck 10. In some examples, the PDU 25 prioritizes electrical power delivery through the refuse truck 10. The PDU 25 can ensure that critical functions (e.g., the prime mover 20, etc.) receive electrical power before auxiliary systems, like an E-PTO system, climate control systems, or radio, for example.

The PDU 25 can control the supply electrical power from the battery 23 to the body assembly 14. In some examples, a disconnect is positioned between the PDU 25 and the body assembly 14 to selectively disable electrical power transmission from the battery 23 to the body assembly 14. The disconnect provides selective electrical communication between the batteries 23 and the body assembly 14 that can allow the secondary vehicle systems (e.g., the lift system, compactor, etc.) to be decoupled and de-energized from the electrical power source. The disconnect can create an open circuit between the batteries 23 and the body assembly 14, such that no electricity is supplied from the batteries 23 to the various systems on the refuse truck 10. The refuse truck 10 can then be operated in a lower power consumption mode, given the reduced electrical load required from the batteries 23 to operate the refuse truck 10. The disconnect further enables the refuse truck 10 to conserve energy when the vehicle subsystems are not needed, and can also be used to lock out the various vehicle subsystems to perform maintenance activities. The disconnect further allows an all-electric vehicle chassis to be retrofit with hydraulic power systems, which can be advantageous for a variety of reasons, as hydraulic power systems may be more responsive and durable than fully electric systems.

Concrete Mixing Truck

Figure 5:
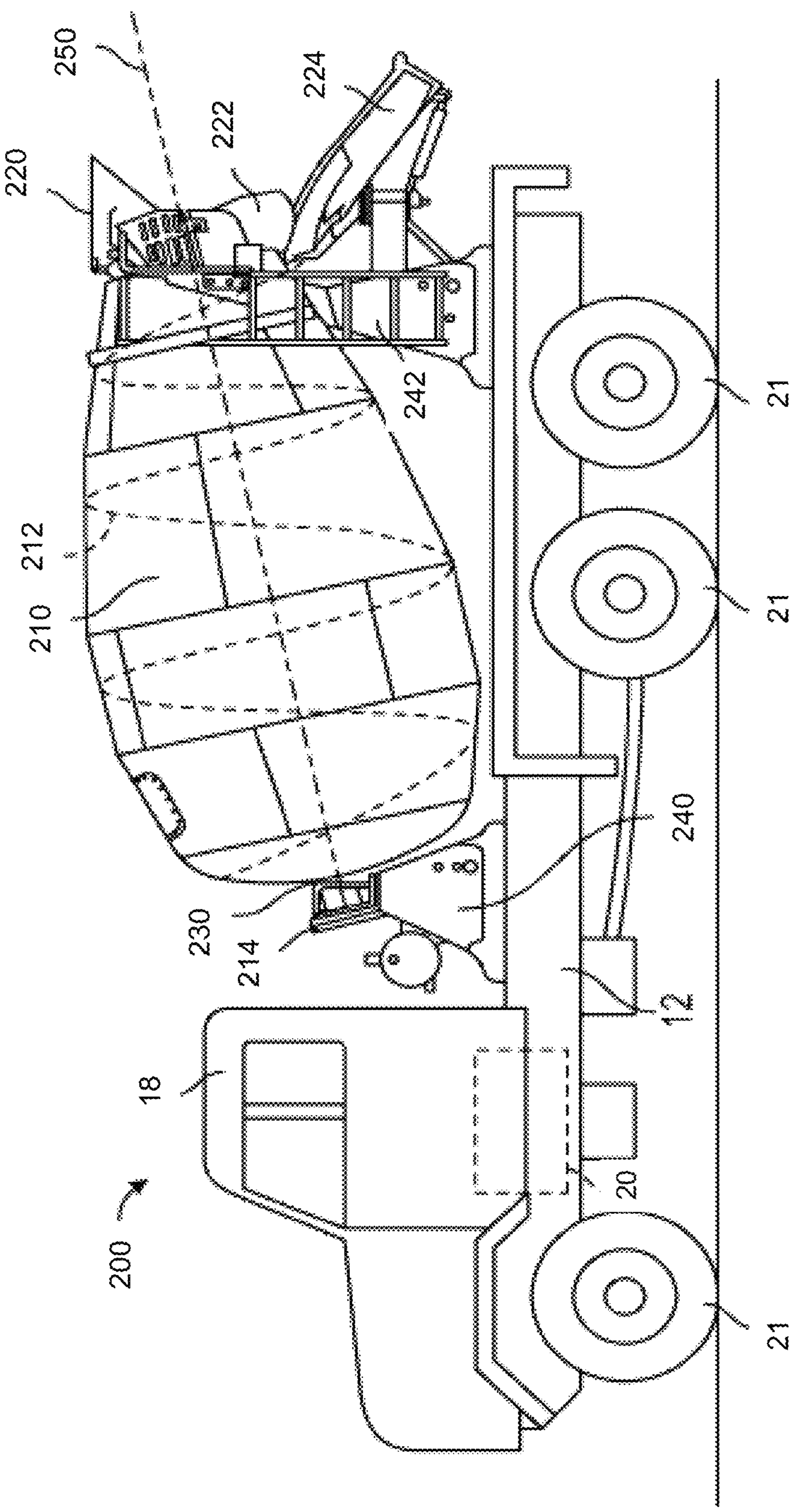
FIG. 5 is a schematic diagram of a rear-discharge concrete mixing truck, according to an exemplary embodiment.
Figure 6:
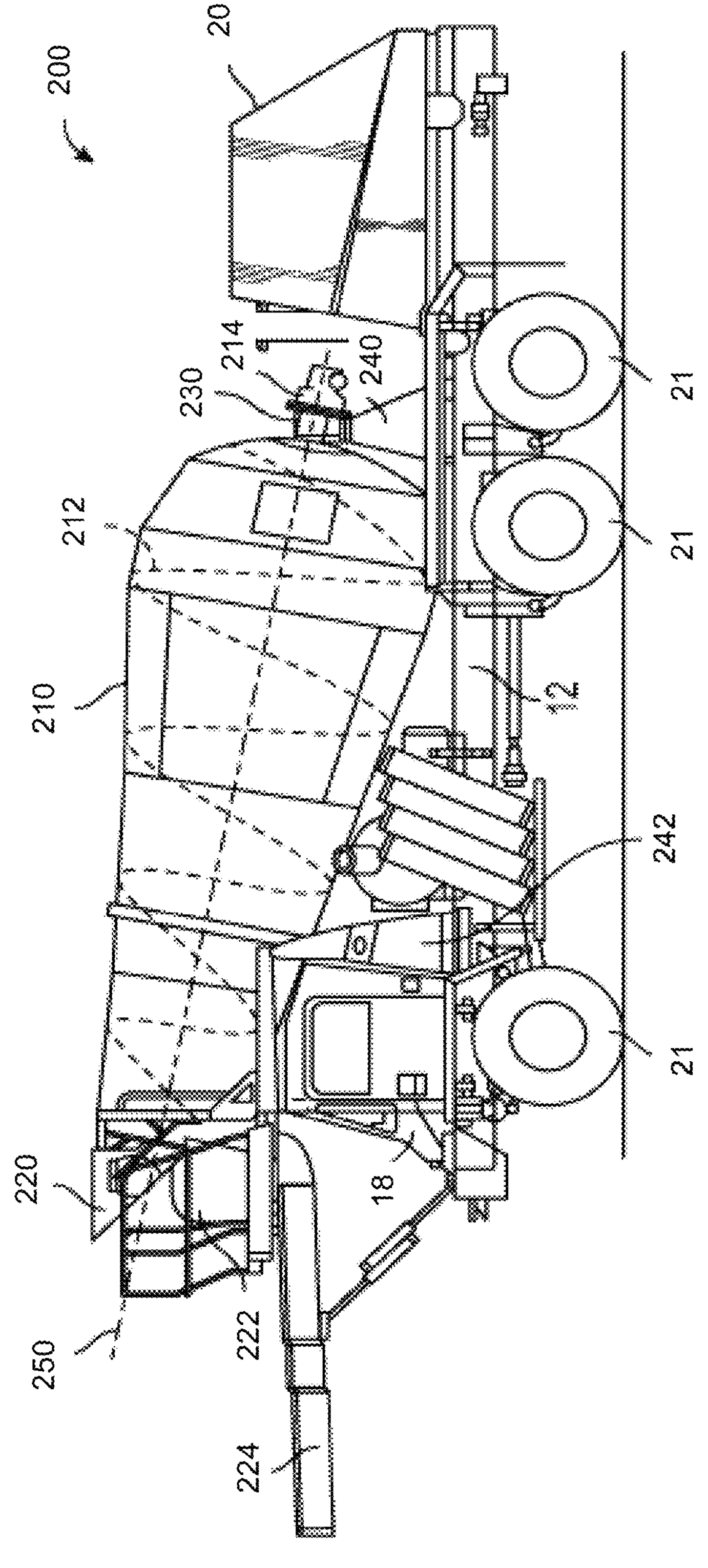
FIG. 6 is a schematic diagram of a front-discharge concrete mixing truck, according to an exemplary embodiment.

Referring to FIGS. 5-6, a vehicle, shown as concrete mixing truck 200 includes a drum assembly, shown as a mixing drum 210. As shown in FIG. 5, the concrete mixing truck 200 is configured as a rear-discharge concrete mixing truck. In other embodiments, such as the embodiment shown in FIG. 6, the concrete mixing truck 200 is configured as a front-discharge concrete mixing truck. As shown in FIG. 5, the concrete mixing truck 200 includes a chassis, shown as the frame 12, and a cabin, shown as the cab 18, coupled to the frame 12 (e.g., at a front end thereof, etc.). The mixing drum 210 is coupled to the frame 12 and disposed behind the cab 18 (e.g., at a rear end thereof, etc.), according to the exemplary embodiment shown in FIG. 5. In other embodiments, such as the embodiment shown in FIG. 6, at least a portion of the mixing drum 210 extends beyond the front of the cab 18. The cab 18 may include various components to facilitate operation of the concrete mixing truck 200 by an operator (e.g., a seat, a steering wheel, hydraulic controls, a control panel, a control device, a user interface, switches, buttons, dials, etc.).

The concrete mixing truck 200 also includes a prime mover or primary driver, shown as prime mover 20. The prime mover 20 provides power to a plurality of motive members, shown as wheels 21, and to other systems of the vehicle. The prime mover 20 may be coupled to the frame 12 at a position beneath the cab 18. The prime mover 20 may be configured to utilize one or more of a variety of fuels (e.g., gasoline, diesel, bio-diesel, ethanol, natural gas, etc.), according to various exemplary embodiments. According to an alternative embodiment, the prime mover 20 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to systems of the concrete mixing truck 200.

The concrete mixing truck 200 may also include a transmission that is coupled to the prime mover 20. The prime mover 20 produces mechanical power (e.g., via electrical power from an on-board energy storage device, due to a combustion reaction, etc.) that may flow into the transmission. The concrete mixing truck 200 may include a vehicle drive system that is coupled to the prime mover 20 (e.g., through the transmission). The vehicle drive system may include drive shafts, differentials, and other components coupling the transmission with a ground surface to move the concrete mixing truck 200. The concrete mixing truck 200 may also include a plurality of tractive elements, shown as wheels 21 that engage a ground surface to move the concrete mixing truck 200. In one embodiment, at least a portion of the mechanical power produced by the prime mover 20 flows through the transmission and into the vehicle drive system to power at least some of the wheels 21 (e.g., front wheels, rear wheels, etc.). In one embodiment, energy (e.g., electrical energy, mechanical energy, etc.) flows along a power path defined from the prime mover 20, through the transmission, and to the vehicle drive system.

As shown in FIGS. 5 and 6, the mixing drum 210 includes a mixing element (e.g., fins, etc.), shown as a mixing element 212, positioned within the interior (e.g., an internal volume) of the mixing drum 210. The mixing element 212 may be configured to mix the contents of mixture within the mixing drum 210 when the mixing drum 210 is rotated (e.g., by a drum drive system) in a first direction (e.g., counterclockwise, clockwise, etc.) and drive the mixture within the mixing drum 210 out of the mixing drum 210 (e.g., through a chute, etc.) when the mixing drum 210 is rotated (e.g., by a drum drive system including a drum driver 214) in an opposing second direction (e.g., clockwise, counterclockwise, etc.). The concrete mixing truck 200 also includes an inlet (e.g., hopper, etc.), shown as charge hopper 220, a connecting structure, shown as discharge hopper 222, and an outlet, shown as chute 224. The charge hopper 220 is fluidly coupled with the mixing drum 210, which is fluidly coupled with the discharge hopper 222, which is fluidly coupled with the chute 224. In this way, wet concrete may flow into the mixing drum 210 from the charge hopper 220 and may flow out of the mixing drum 210 into the discharge hopper 222 and then into the chute 224 to be dispensed. According to an exemplary embodiment, the mixing drum 210 is configured to receive a mixture, such as a concrete mixture (e.g., cementitious material, aggregate, sand, rocks, etc.), through the charge hopper 220.

The drum driver 214 is configured to provide mechanical energy (e.g., in a form of an output torque) to rotate the mixing drum 210. The drum driver 214 may be a hydraulic motor, an electric motor, a power take off shaft coupled to the prime mover 20, or another type of driver. The drum driver 214 is coupled to the mixing drum 210 by a shaft, shown as drive shaft 230. The drive shaft 230 is configured to transfer the output torque to the mixing drum 210.

As shown in FIGS. 5-6, the mixing drum 210 may be coupled to supports (e.g., pedestals, etc.), shown as pedestal 240 and pedestal 242. The pedestal 240 and the pedestal 242 may be coupled to the frame 12 of the concrete mixing truck 200. The pedestal 240 and the pedestal 242 may function to cooperatively couple (e.g., attach, secure, etc.) the mixing drum 210 to the frame 12 and facilitate rotation of the mixing drum 210 relative to the frame 12. In an alternative embodiment, the mixing drum 210 is configured as a stand-alone mixing drum that is not coupled (e.g., fixed, attached, etc.) to a vehicle. In such an embodiment, the mixing drum 210 may be mounted to a stand-alone frame. The stand-alone frame may be a chassis including wheels that assist with the positioning of the stand-alone mixing drum on a worksite. Such a stand-alone mixing drum may also be detachably coupled to and/or capable of being loaded onto a vehicle such that the stand-alone mixing drum may be transported by the vehicle.

As shown in FIGS. 5-6, the mixing drum 210 defines a central, longitudinal axis 250. According to an exemplary embodiment, the mixing drum 210 is selectively rotated about the longitudinal axis 250 (e.g., by the drum driver 214). The longitudinal axis 250 may be angled relative to the frame (e.g., the frame 12 of the concrete mixing truck 200) such that the longitudinal axis 250 intersects with the frame 12. For example, the longitudinal axis 250 may be elevated from the frame 12 at an angle in the range of five degrees to twenty degrees. In other embodiments, the longitudinal axis 250 may be elevated by less than five degrees (e.g., four degrees, three degrees, etc.) or greater than twenty degrees (e.g., twenty-five degrees, thirty degrees, etc.). In an alternative embodiment, the concrete mixing truck 200 includes an actuator positioned to facilitate selectively adjusting the longitudinal axis 250 to a desired or target angle (e.g., manually in response to an operator input/command, automatically according to a control scheme, etc.).

Control System

Figure 7:
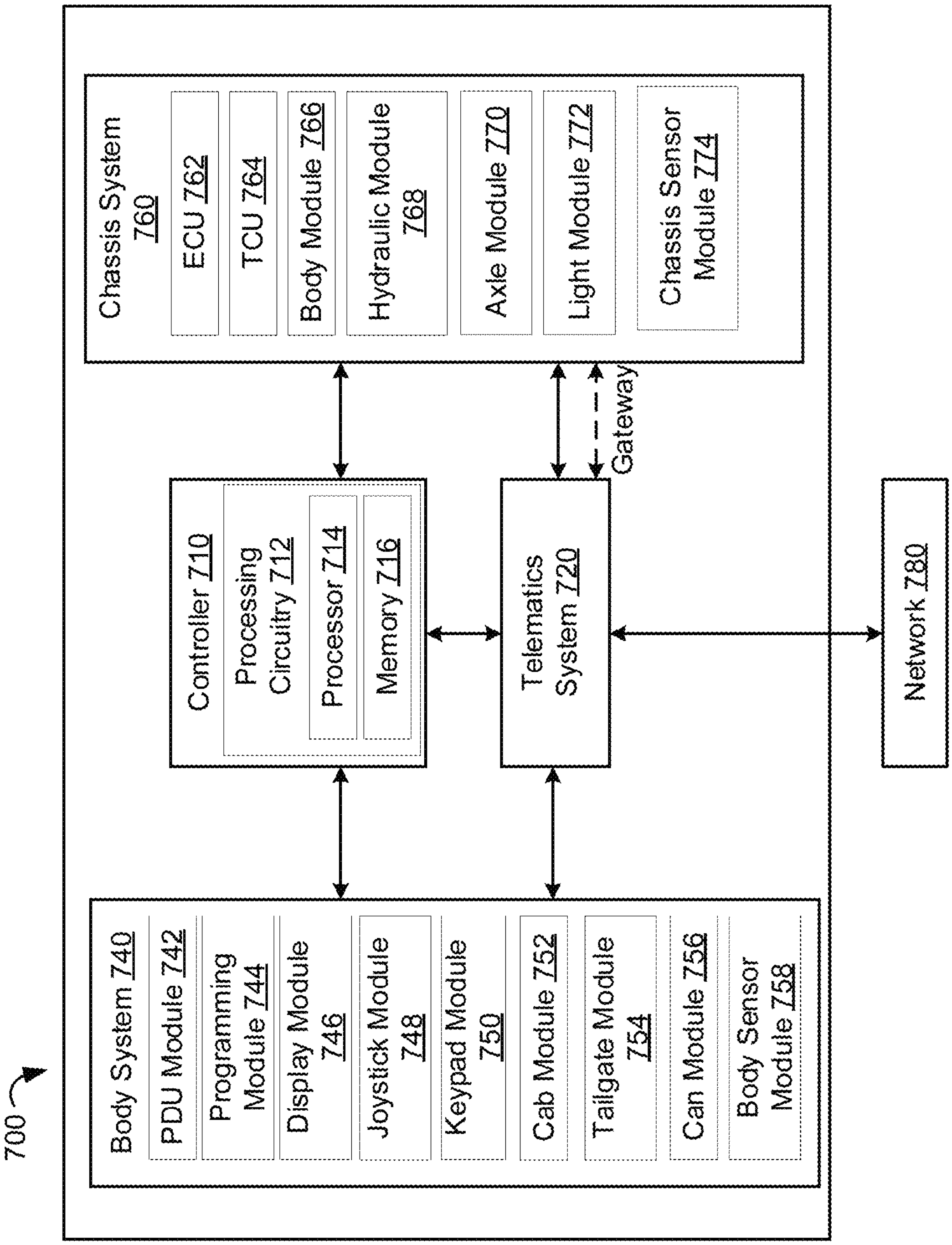
FIG. 7 is a schematic view of a control system that can be incorporated into the vehicle of any of FIGS. 1-6, according to an exemplary embodiment.

Referring now to FIG. 7, a vehicle (e.g., the refuse truck 10, the concrete mixing truck 200, etc.) may include a control system 700, which may include a controller 710 that communicates with a telematics system 720, a body system 740, and/or a chassis system 760. Although the control system 700 is described herein as being incorporated with the refuse truck 10, it should be understood that in other embodiments the control system 700 is incorporated with other vehicles (e.g., the concrete mixing truck 200, etc.) and/or includes additional, fewer, and/or different working components.

According to an exemplary embodiment, the control system 700 is configured to receive and/or send a variety of different vehicle parameters and/or information relating to the refuse truck 10, in order to execute different vehicle functions (e.g., vehicle diagnostics, configurations, control functions, system updates, fleet management, etc.). For example, the controller 710 may be configured to receive vehicle identification information (e.g., a vehicle identification number, vehicle type, etc.) from the body system 740 (e.g., via the telematics system 720). Based on the vehicle identification information, the controller 710 may also be configured to determine a set of additional information (e.g., configuration data) to be received relating to the refuse truck 10 (e.g., parameters, conditions, statuses, etc.). The controller 710 may then receive that additional information/data from the body system 740 and/or the chassis system 760 (e.g., via the telematics system 720), and perform vehicle analysis (e.g., vehicle diagnostics, fleet management, etc.). In some embodiments, the controller 710 is further configured to communicate the additional information and/or the vehicle analysis to a network 780 (e.g., the internet, a fleet management system, etc.), for example for further analysis.

As shown in FIG. 7, the controller 710 is shown to include processing circuitry 712 having a processor 714 and memory 716. Processor 714 can be implemented as a general purpose processor, an application specific integrated circuit (ASIC), one or more field programmable gate arrays (FPGAs), a group of processing components, or other suitable electronic processing components. Memory 716 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 716 may include volatile memory or non-volatile memory. Memory 716 may also include database components, object code components, script components, or any other type of information structure for supporting the various activities and information structures described herein.

The controller 710 may also be configured to communicate with, and/or control operation of, the body system 740 on the body assembly 14 and/or on the frame 12 of the refuse truck 10. In an exemplary embodiment, the body system 740 may communicate with the controller 710 via an internal communications network, such as a controller area network (CAN bus) or another vehicle electronic communications protocol. According to an exemplary embodiment, the body system 740 is configured to communicate vehicle identification information (e.g., a vehicle identification number, vehicle type, etc.) to the controller 710 (e.g., via the telematics system 720), which may be used to determine additional information to be received, perform vehicle analysis (e.g., diagnostics, management, etc.), and/or send additional information relating to the refuse truck 10, as discussed below. As shown in FIG. 7, the body system 740 includes a PDU module 742, a programming module 744, a display module 746, a joystick module 748, a keypad module 750, a cab module 752, a tailgate module 754, a can module 756, and a body sensor module 758.

According to an exemplary embodiment, the PDU module 742 is configured to send and/or receive information relating to the PDU 25. For example, the PDU module 742 may send/receive information relating to an electric stop function of the refuse truck 10, an output power of the refuse truck 10, a power function of the body assembly 14, power provided to a fan, power provided to a sensor (or sensors), power provided to the cab 18, power provided to a human machine interface, whether or not the PDU is connected, etc. The programming module 744 may be configured to send/receive information relating to a programming port of the refuse truck 10. In an exemplary embodiment, the display module 746 is configured to send/receive information relating to (e.g., provided via) a display of the refuse truck 10. For example, the display module 746 may send/receive information relating to vehicle speed, remaining battery life, motor temperature, fluid pressure, information about the subsystems on the vehicle, including the hydraulics, and the like.

In an exemplary embodiment, the joystick module 748 is configured to send/receive information relating to (e.g., provided via) a joystick of the refuse truck 10. For example, the joystick module 748 may send/receive information relating to a collection apparatus (e.g., the position and/or orientation of the lifting system 30, etc.), the status of the transmission of the refuse truck 10 (e.g., drive gear, neutral gear, reverse gear, park gear, etc.), etc. The keypad module 750 may be configured to send/receive information relating to (e.g., provided via) a keypad of the refuse truck 10. For example, and similar to the display module 746, the keypad module 750 may send/receive information relating to vehicle speed, remaining battery life, motor temperature, fluid pressure, information about the subsystems on the vehicle, including the hydraulics, and the like.

According to an exemplary embodiment, the cab module 752 is configured to send/receive information relating to the cab 18. For example, the cab module 752 may send/receive information relating to cab controls (e.g., climate controls, steering, lights, etc.), cab warnings (e.g., cab warning lights, cab alarm, etc.), driver preferences (e.g., mirror positioning, seat positioning, driver profiles, etc.), etc. Similarly, the tailgate module 754 may be configured to send/receive information relating to the tailgate 26. For example, the tailgate module 754 may send/receive information relating to the rear brakes, a rear taillight, a tailgate warning (e.g., tailgate lights, tailgate alarms, etc.), the position and/or orientation of a rear axle, etc.

In an exemplary embodiment, the can module 756 is configured to send/receive information relating to a carry can (e.g., a refuse container, etc.). For example, the can module 756 may send/receive information relating to the position/orientation of a refuse container, the arms 32, the forks 34, the grabber 38, an actuator, etc., the weight/force applied at a refuse container, the arms 32, the forks 34, the grabber 38, an actuator, etc. According to an exemplary embodiment, the body sensor module 758 is configured to send/receive information to/from sensors positioned about the body assembly 14. For example, the body sensor module 758 may send/receive information to/from sensors positioned at the receptacle 16, the cab 18, the panels 22, the cover 24, the lifting system 30, etc.

As shown in FIG. 7, the controller 710 is also configured to communicate with, and/or control operation of, the chassis system 760 on the frame 12 of the refuse truck 10. In an exemplary embodiment, the chassis system 760 communicates with the controller 710 via an internal communications network, such as a controller area network (CAN bus) or another vehicle electronic communications protocol As discussed above, according to an exemplary embodiment, after the controller 710 receives vehicle identification information (e.g., a vehicle identification number, a vehicle type, etc.) from the body system 740 (e.g., via the telematics system 720), the controller 710 is configured to determine what additional information (e.g., configuration data) is to be received relating to the refuse truck 10 (e.g., vehicle parameters, conditions, statuses, etc.). In this regard, the controller 710 may further be configured to receive the additional information/data from the chassis system 760 (e.g., via the telematics system 720), perform vehicle analysis (e.g., vehicle diagnostics, fleet management, etc.), and/or communicate the additional information to a network 780. As shown in FIG. 7, the chassis system 760 includes an engine control module 762 (hereinafter "ECU 762"), a transmission control module 764 (hereinafter "TCU 764"), a body module 766, a hydraulic module 768, an axle module 770, a light module 772, and a chassis sensor module 774.

According to an exemplary embodiment, the ECU 762 is configured to send/receive information relating to the prime mover 20. For example, the ECU 762 may send/receive information relating to the power provided to various components of the refuse truck 10 (e.g., the controller 710, a hydraulic system, the wheels 21, etc.), battery and/or fuel levels, the efficiency of the prime mover 20, etc. The TCU 764 may be configured to send/receive information relating to the transmission of the refuse truck 10. According to an exemplary embodiment, the body module 766 is configured to send/receive information relating to various components of the refuse truck 10 (e.g., the body assembly 14). For example, the body module 766 may send/receive information relating to the position/orientation of the arms 32 (e.g., in home, up/down in ramp, extended, etc.), the position/orientation of the grabber 38 (e.g., extended, stowed, etc.), the position/orientation of the packer 62 (e.g., extended, retracted, etc.), the position/orientation of the doors (e.g., the top door 36, side door, etc.), the position/orientation of the tailgate (e.g., opened, closed, etc.), etc. Further, the body module 766 may be configured to send/receive information relating to the brakes and/or speed of the refuse truck 10 (e.g., electronic stop enabled/disabled, speed limiter enabled/disabled, etc.), the lights (e.g., taillights, cab lights, etc.), the ignition, the position/orientation of the refuse truck 10 as a whole (e.g., turned left, turned right, inclined, declined, etc.), etc.

In an exemplary embodiment, the hydraulic module 768 is configured to send/receive information relating to a hydraulic system of the refuse truck 10. For example, the hydraulic module 768 may send/receive information relating to hydraulic cylinders within the lifting system 30 (e.g., hydraulic fluid levels, coil resistance levels, oil level, oil temperature, etc.), hydraulic pumps, the lifting system 30 as a whole (e.g., weight applied to a front load sensor, a rear load sensor, etc.), etc. The axle module 770 may be configured to send/receive information relating to various axles of the refuse truck 10. For example, the axle module 770 may send/receive information relating to the position/orientation of a tag axle (e.g., up, down, etc.), a pusher axle (e.g., up, down, etc.), a front/rear axle, etc. According to an exemplary embodiment, the light module 772 is configured to send/receive information relating to various lights of the refuse truck 10. For example, the light module 772 may send/receive information relating to the status of work lights (e.g., an arm work light, a side work light, a hopper work light, etc. is/are working, out, etc.), front lights (e.g., left light, right light, cab light, etc. is/are working, out, etc.), midship lights (e.g., left light, right light, taillights, etc. is/are working, out, etc.), etc. Also according to an exemplary embodiment, the chassis sensor module 774 is configured to send/receive information to/from sensors positioned about the chassis (e.g., the frame 12). For example, the chassis sensor module 774 may send/receive information to/from sensors positioned at the frame 12, the prime mover 20, the wheels 21, the batteries 23, axles of the refuse truck 10, etc.

Referring still to FIG. 7, according to an exemplary embodiment the control system 700 also includes the telematics system 720. The telematics system 720 may be configured to communicate with the body system 740 and the chassis system 760 (and/or the network 780), so as to send/receive information relating to the refuse truck 10. Similar to the controller 710, in an exemplary embodiment, the telematics system 720 may communicate with the body system 740 and/or the chassis system 760 via an internal communications network, such as a controller area network (CAN bus) or another vehicle electronic communications protocol. As discussed above with regard to the controller 710, the telematics system 720 may be configured to receive vehicle identification information (e.g., a vehicle identification number, a truck type, etc.) from the body system 740. Based on the vehicle identification information, the telematics system 720 may be configured to determine what additional information (e.g., configuration data) is to be received relating to the refuse truck 10 (e.g., vehicle parameters, conditions, statuses, etc.). Further, the telematics system 720 may also be configured to perform vehicle analysis (e.g., vehicle diagnostics, fleet management, etc.). In this regard, the telematics system 720 may receive additional information/data relating to the refuse truck 10 from the body system 740 and/or the chassis system 760, perform vehicle analysis, and/or communicate the additional information/analysis to a network 780.

As shown in FIG. 7, in an exemplary embodiment the telematics system 720 is in direct communication with the chassis system 760. In other embodiments, the telematics system 720 is otherwise in communication with the chassis system 760, for example via a gateway that bridges the telematics system 720 and the chassis system 760. Further, according to an exemplary embodiment the telematics system 720 is configured to communicate with the network 780 (e.g., the internet, a fleet management system, etc.). In this regard, the telematics system 720 may be configured to communicate the additional information/analysis relating to the refuse truck 10 to the network 780, for example for further analysis of vehicle functions (e.g., diagnostics, configurations, control functions, system updates, etc.). In some embodiments, the telematics system 720 is configured to communicate with the network 780, and/or the body system 740 and the chassis system 760, so as automatically update the components of the control system 700. In an exemplary embodiment, the telematics system 720 is a controller area network (CAN bus) configured to communicate with the body system 740 and/or the chassis system 760. In other embodiments, the telematics system 720 is/includes other suitable communication system(s) (e.g., cellular, Wi-Fi, Ethernet, Bluetooth, real-time communications (RTC), graph neural network (GNN), simultaneous global positioning system, Glonass, BeiDou, Galileo, 3-axis accelerometer/inclinometer, etc.).

It should be understood that while FIG. 7 illustrates a control system 700 having a controller 710, a telematics system 720, a body system 740, and a chassis system 760, in other embodiments the control system 700 includes additional, fewer, and/or different working components. For example, the control system 700 may include a human machine interface, a user interface, an alert system, camera modules, lighting systems modules, global positioning system modules, cab control modules, suspension modules, motor modules, battery modules, a mixing drum module, a drum drive module, a hopper module, etc.

Refuse Truck Control and Diagnostics

The control schematic and architecture shown in FIG. 7 can be used to execute a variety of different vehicle functions and modes within the refuse truck 10. For example, and as demonstrated in FIG. 7, the refuse truck 10 can include a body system 740 and a chassis system 760. The body system 740 and/or the chassis system 760 may include one or more sensors positioned about the body assembly 14 and/or the frame 12. The sensors may be configured to monitor the position, orientation, condition, status, etc. of various components of the refuse truck 10, and communicate with the controller 710 and/or the telematics system 720. The sensors and controller 710 and/or the telematics system 720 can together receive, analyze, and/or communicate information relating to the various components of the refuse truck 10, as discussed below.

Figure 8:
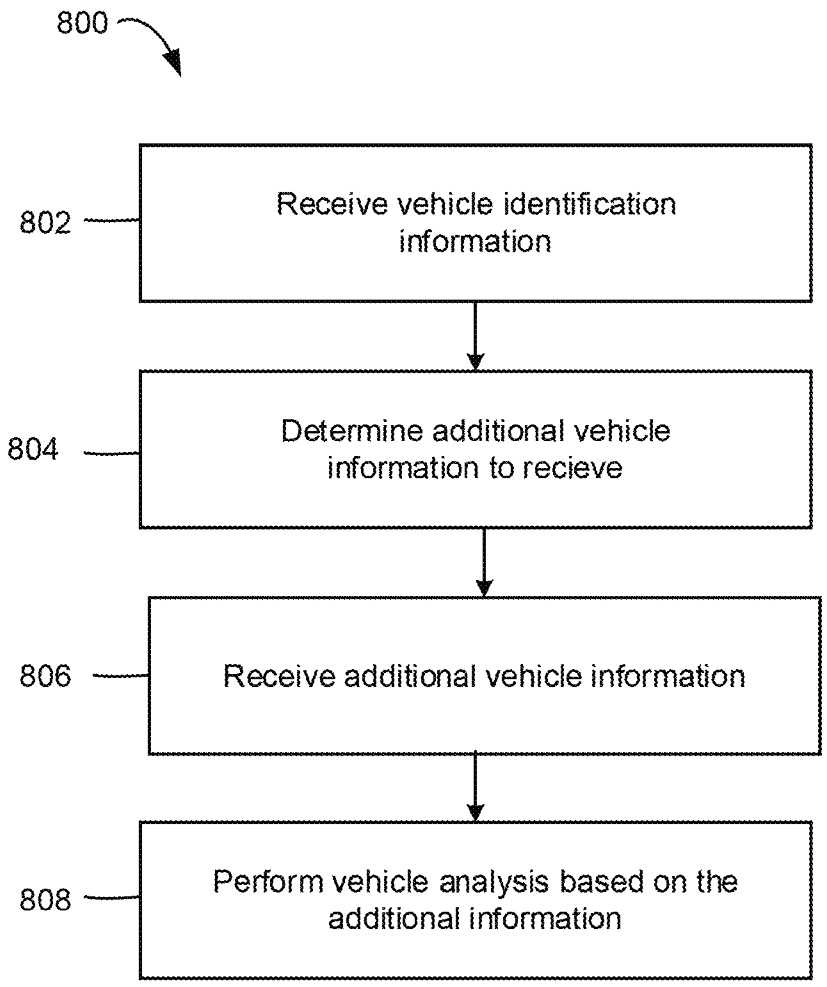
FIG. 8 is a flow diagram for a process for controlling and/or monitoring parameters of the vehicle of any of FIGS. 1-6, according to an exemplary embodiment.

Referring now to FIG. 8, a process 800 for controlling and/or monitoring parameters of a vehicle is shown, according to an exemplary embodiment. According to an exemplary embodiment, the vehicle is the refuse truck 10 of FIGS. 1-4, and the process 800 is executed using the components of the control system 700 of FIG. 7. In other embodiments, the vehicle is the concrete mixing truck 200 of FIGS. 5-6, and the process 800 is executed using the components of the control system 700 of FIG. 7, along with additional components (e.g., a mixing drum module, a drum drive module, a hopper module, etc.).

At step 802, vehicle identification information is received, according to an exemplary embodiment. In an exemplary embodiment, the vehicle identification information is a vehicle identification number that identifies a vehicle configuration (e.g., the refuse truck 10, a front loading refuse truck, a side loading refuse truck, a rear loading refuse truck, the concrete mixing truck 200, etc.); however, in other embodiments the vehicle identification information includes other vehicle information (e.g., vehicle type, vehicle model, etc.). According to an exemplary embodiment, the vehicle identification information is directly received by the telematics system 720 from the body system 740 (e.g., via direct communication, etc.). In some embodiments, the vehicle identification information is received by the telematics system 720 from another suitable source (e.g., a sensor, a user device, the network 780, etc.). In other embodiments, the vehicle identification information is received by another component of the control system 700 (e.g., the controller 710, etc.).

At step 804, additional vehicle information to be received is determined, according to an exemplary embodiment. In an exemplary embodiment, after the vehicle identification information is received (and the vehicle configuration is determined), additional vehicle information to be received is determined based on the vehicle configuration. For example, it may be determined that additional information is needed relating to the PDU 25 (e.g., power provided to a fan, sensor, the cab, a human machine interface, etc.), the cab 18 (e.g., cab controls, warnings, alarms, etc.), the tailgate 26 (e.g., rear brakes, taillights, warnings, etc.), the body assembly 14 (e.g., position/orientation of the arm 32, grabber 38, packer 62, doors, etc.), a hydraulic system, an axle (e.g., position/orientation of tag axle, front/rear axle, etc.), etc. In some embodiments, the information to be received is determined by user preferences, manufacturer preferences, predetermined formulas (algorithms, equations, etc.), and/or another suitable method. In an exemplary embodiment, the additional information to be received is determined by the telematics system 720; however, in other embodiments, the additional information to be received is determined by other components of the control system 700 (e.g., the controller 710).

At step 806, the additional information is received, according to an exemplary embodiment. According to an exemplary embodiment, after the additional information to be received is determined (e.g., via the telematics system 720 based on the vehicle configuration), the additional information is received from the body system 740 and/or the chassis system 760. The telematics system 720 may receive the additional information directly (e.g., via direct communication) from the modules 742-758 of the body system 740 and/or the modules 762-774 of the chassis system 760. In some embodiments, the telematics system 720 receives the additional information indirectly (e.g., via a gateway) from the modules 762-774 of the chassis system 760. In yet other embodiments, other components of the control system 700 (e.g., the controller 710) receive the additional information from the body system 740, the chassis system 760, and/or another suitable source (e.g., a sensor, a user device, the network 780, etc.).

At step 808, vehicle analysis is performed, according to an exemplary embodiment. According to an exemplary embodiment, after the telematics system 720 receives the additional information (e.g., all suitable vehicle information), the telematics system 720 performs vehicle analysis. According to an exemplary embodiment, the vehicle analysis is vehicle diagnostics and/or fleet management analysis, which may be performed at predetermined intervals (e.g., set days, times, intervals, etc.) and/or in real-time. In some embodiments, the telematics system 720 may further be configured to control components of the refuse truck 10 (e.g., control systems, the prime mover 20, the arm 32, grabber 38, packer 62, doors, etc.) based on the vehicle analysis. In other embodiments, the telematics system 720 is further configured to communicate the vehicle analysis (and/or the additional information) to the network 780, for example for further analysis (e.g., vehicle diagnostics, fleet management, etc.) and/or processing. In yet other embodiments, other components of the control system 700 (e.g., the controller 710) is configured to perform vehicle analysis, control the vehicle, and/or communicate the vehicle analysis and/or additional information to other components (e.g. a sensor, a user device, the network 780, etc.).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:

a chassis having a frame and a first sensor, the chassis coupled with a plurality of wheels;

a body assembly for storing refuse, the body assembly having a second sensor and supported by the chassis;

a control system having one or more processors and one or more memory devices, the control system comprising a body system, a chassis system, and a telematics system, wherein the body system is communicably coupled with the body assembly, the chassis system is communicably coupled with the chassis, and the telematics system is communicably coupled with the body system and the chassis system, and wherein the telematics system is configured to:

communicate, to the body system, a first request for a first vehicle identifier;

receive, from the body system, the first vehicle identifier;

determine, based on the first vehicle identifier, a vehicle configuration;

communicate, based on the vehicle configuration and to at least one of the body system and the chassis system, a second request for additional vehicle information;

receive, from at least one of the body system and the chassis system, the additional vehicle information; and perform, based on the additional vehicle information, a vehicle analysis, wherein the vehicle analysis includes a first characteristic of a first component of the vehicle.

2. The refuse vehicle of claim 1, wherein the first vehicle identifier is a vehicle identification number.

3. The refuse vehicle of claim 1, wherein the additional vehicle information includes at least one of data relating to an electronic stop function of the refuse vehicle, a power output of the refuse vehicle, and a power function of the body assembly.

4. The refuse vehicle of claim 1, wherein the additional vehicle information includes at least one of data relating to a position of a refuse container, a position of an arm, a weight of the refuse container, and a force applied to the arm.

5. The refuse vehicle of claim 1, wherein the additional vehicle information includes at least one of data relating to a fuel level, a power usage of a prime mover, and an efficiency measure of the prime mover.

6. The refuse vehicle of claim 1, wherein the additional vehicle information includes at least one of data relating to a hydraulic fuel level, a coil resistance level, an oil level, and an oil temperature.

7. The refuse vehicle of claim 1, wherein the additional vehicle information includes at least one of data relating to a position of a tag axle, a position of a pusher axle, and a position of a rear axle.

8. The refuse vehicle of claim 1, wherein the additional vehicle information includes at least one of data relating to a status of a work light, a status of a front light, and a status of a midship light.

9. The refuse vehicle of claim 1, wherein the chassis system is communicably coupled with the telematics system via a gateway.

10. The refuse vehicle of claim 1, wherein the telematics system is further configured to:

communicate, to the chassis system, a third request for a second vehicle identifier; and receive, from the chassis system, the second vehicle identifier, wherein the second vehicle identifier is a vehicle identification number.

11. The refuse vehicle of claim 1, wherein the telematics system is further configured to communicate the first characteristic of the first component of the vehicle to a network.

12. The refuse vehicle of claim 1, wherein the telematics system is further configured to communicate a control decision to the body system, wherein the control decision is based on the first characteristic of the first component of the vehicle.

13. The refuse vehicle of claim 1, wherein the telematics system is further configured to:

receive, from a network, a system update, the system update relating to a component of the body system; and communicate, to the body system, the system update to update the component of the body system.

14. The refuse vehicle of claim 1, wherein the telematics system is further configured to:

receive, from a network, second vehicle information of a second vehicle; and perform, based on the additional vehicle information and the second vehicle information of the second vehicle, a fleet analysis, wherein the fleet analysis includes the first characteristic of the first component of the vehicle and a second characteristic of a second component of the second vehicle.

15. A method, comprising:

communicating, via a telematics system and to a body system, a first request for a first vehicle identifier;

receiving, by the telematics system and from the body system, the first vehicle identifier;

determining, by the telematics system and based on the first vehicle identifier, a vehicle configuration;

communicating, via the telematics system and based on the vehicle configuration, a second request for additional vehicle information to at least one of the body system and a chassis system;

receiving, by the telematics system and from at least one of the body system and the chassis system, the additional vehicle information; and performing, by the telematics system and based on the additional vehicle information, a vehicle analysis, wherein the vehicle analysis includes a first characteristic of a first component of a vehicle.

16. The method of claim 15, further comprising:

communicating, via the telematics system and to the chassis system, a third request for a second vehicle identifier; and receiving, by the telematics system and from the chassis system, the second vehicle identifier, wherein the second vehicle identifier is a vehicle identification number.

17. The method of claim 16, further comprising communicating, by the telematics system, the first characteristic of the first component of the vehicle to a network.

18. The method of claim 17, further comprising communicating, by the telematics system, a control decision to the body system, wherein the control decision is based on the first characteristic of the first component of the vehicle.

19. A vehicle system, comprising:

a network; and a control system having one or more processors and one or more memory devices, the control system comprising a body system, a chassis system, and a telematics system, wherein the body system is communicably coupled with a body assembly, wherein the chassis system is communicably coupled with a chassis, and wherein the telematics system is configured to:

communicate, to the body system, a first request for a first vehicle identifier;

receive, from the body system, the first vehicle identifier;

determine, based on the first vehicle identifier, a vehicle configuration;

communicate, based on the vehicle configuration and to at least one of the body system and the chassis system, a second request for additional vehicle information;

receive, from at least one of the body system and the chassis system, the additional vehicle information;

perform, based on the additional vehicle information, a vehicle analysis, wherein the vehicle analysis includes a first characteristic of a first component of the vehicle;

communicate the first characteristic of the first component of the vehicle to the network; and communicate a control decision to the body system, wherein the control decision is based on the first characteristic of the first component of the vehicle.

20. The vehicle system of claim 19, wherein the telematics system is further configured to:

receive, from the network, a system update, the system update relating to the first component of the vehicle; and communicate, to at least one of the body system and the chassis system, the system update to update the first component of the vehicle.

* * * * *